United States Patent [19]
Dexter et al.

[11] Patent Number: 5,921,519
[45] Date of Patent: Jul. 13, 1999

[54] PIVOTAL ARM CONTAINER HOLDER

[75] Inventors: Brian R. Dexter, Grand Haven; David J. Spykerman, Zeeland, both of Mich.

[73] Assignee: Prince Corporation, Holland, Mich.

[21] Appl. No.: 08/942,913

[22] Filed: Oct. 2, 1997

[51] Int. Cl.⁶ .................................................. A47K 1/08
[52] U.S. Cl. ...................... 248/311.2; 224/539; 224/926; 297/188.16
[58] Field of Search .................. 248/311.2; 224/926, 224/539, 148.7; 297/188.01, 188.14, 188.15, 188.16, 188.17, 188.18, 188.19

[56] References Cited

U.S. PATENT DOCUMENTS

| | | |
|---|---|---|
| 3,039,616 | 6/1962 | Proffit . |
| 5,170,980 | 12/1992 | Burrows et al. ..................... 248/311.2 |
| 5,330,146 | 7/1994 | Spykerman ........................... 248/311.2 |
| 5,385,325 | 1/1995 | Rigsby ..................................... 248/313 |
| 5,390,887 | 2/1995 | Campbell ............................. 248/311.2 |
| 5,419,478 | 5/1995 | Mauro et al. ....................... 224/926 X |
| 5,445,350 | 1/1995 | Rigsby ..................................... 248/313 |
| 5,474,272 | 12/1995 | Thompson et al. .................. 248/311.2 |
| 5,713,502 | 2/1998 | Dixon .................................. 224/539 X |
| 5,800,011 | 9/1998 | Spykerman ........................ 297/188.19 |

Primary Examiner—Ramon O. Ramirez
Attorney, Agent, or Firm—Price, Heneveld, Cooper, DeWitt & Litton

[57] ABSTRACT

A tray-like container holder includes an arm which pivots outwardly from a sidewall thereof and is detented to numerous fixed positions to divide the tray-like area into one or more storage areas of different sizes to accommodate different sized container holders on opposite sides of the arm. The arm can be retracted to provide a general storage bin.

20 Claims, 2 Drawing Sheets

PIVOTAL ARM CONTAINER HOLDER

BACKGROUND OF THE INVENTION

The present invention relates to container holders for vehicles, such as automobiles, and particularly to an adjustable container holder incorporating a pivotal dividing arm.

Vehicles, such as automobiles and utility vehicles, frequently include container holders for holding beverages at a location convenient for use by the vehicle operator or passenger. Such container holders typically accommodate Styrofoam coffee cups or beverage cans. Some container holders are somewhat adjustable such that handled coffee cups and mugs can also be accommodated. Such container holders typically extend from the instrument panel of a vehicle in a retractable mounting arrangement, extend from a drawer from a center console, or pivot outwardly from a console or armrest of a vehicle so as to position the container holder in a location readily accessible by the vehicle operator or passenger. Several adjustable container holders have been suggested as, for example, in U.S. Pat. Nos. 5,170,980 and 5,330,146, both of which are assigned to the present assignee. Such container holders, in addition to being adjustable for different container sizes, can be dividable into sections which are larger or smaller to accommodate different sized containers.

The desirability of such construction is readily apparent where different types of coffee or other beverage containers may be utilized at the same time by the operator and passenger. Accordingly, the convenience of such construction is well recognized, however, there exists a need for such construction which has fewer moving parts and is relatively inexpensive to manufacture due to the continued demand to control the cost of vehicle accessories in today's competitive market.

SUMMARY OF THE PRESENT INVENTION

The container holder of the present invention satisfies this need by providing a tray-like storage area creating a container holder with an arm which pivots outwardly from a sidewall thereof and can be detentably fixed to numerous positions to divide the tray-like area into one or more storage areas of different sizes to accommodate different sized container holders on opposite sides of the arm. The arm can be retracted to provide a general storage bin. Thus, the container holder of the present invention serves both as a container holder as well as a storage tray and can be conventionally mounted in a vehicle console or other vehicle location for use. By integrally molding the tray of a suitable polymeric material and also molding the pivotally mounted arm, the cost of the container holder is greatly reduced. By providing a container holder with but a single moving part, the reliability and ease of use of such adjustable container holder is also improved.

These and other features, objects and advantages of the present invention will become apparent upon reading the following description thereof together with reference to the accompanying drawings.

DETAILED DESCRIPTION OF THE PREFERRED EMBODIMENT

Figure 1:
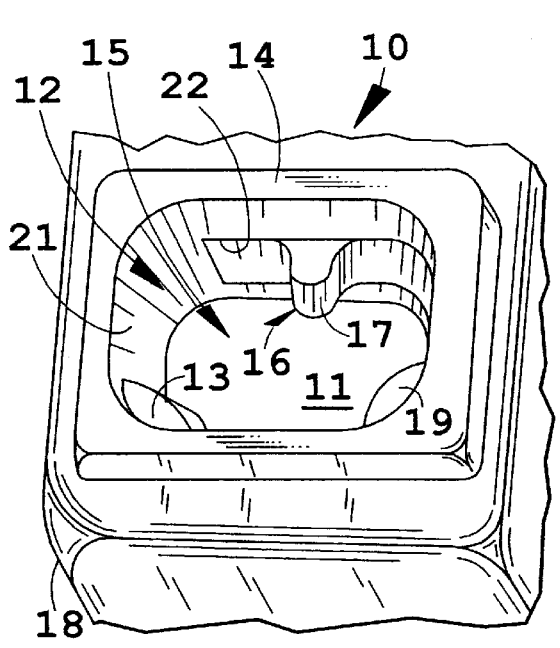
FIG. 1 is a fragmentary top perspective view of a container holder of the present invention, with the partitioning arm shown in a first position.
Figure 2:
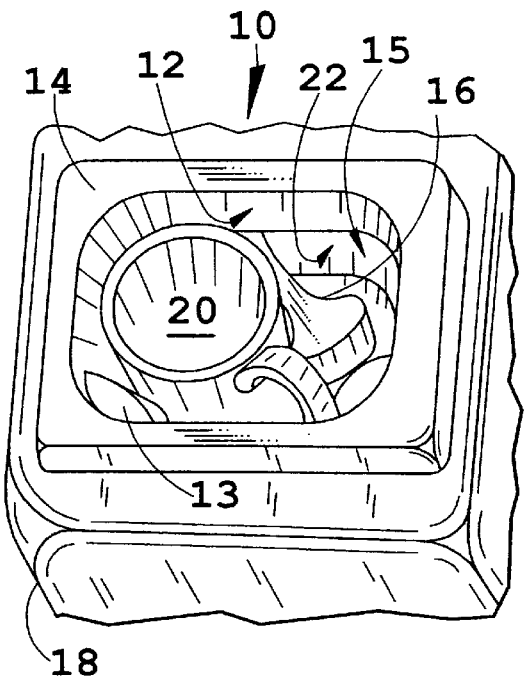
FIG. 2 is a fragmentary top perspective view of the container holder shown in FIG. 1, with the partitioning arm extended from a stored position to a position providing storage for a relatively large mug.

Referring initially to FIGS. 1 and 2, there is shown a container holder assembly 10 embodying the present invention which includes an integrally molded tray-like base 12, a top cover 14 and a partitioning arm 16 pivotally mounted to selectively extend within the central storage cavity 15 of the tray 12 for dividing the storage area into one or more areas for holding different sized containers or other objects. The container holder assembly 10 can be mounted to a drawer 18 which extends either from the instrument panel, center console or center armrest of a vehicle in a conventional manner. Alternatively, the container holder 10 can be fixedly mounted to such a vehicle accessory and selectively covered or uncovered. The pivoting partitioning arm 16 is shown in a stored position in FIG. 1 in which a projection 17 extends generally centrally within the storage area 15 dividing it into two equal left and right container holder sections, which are further defined by quarter round projection 13 and 19 formed in the tray 12. When pivoted to an extended position, as shown in FIG. 2, the partitioning arm 16 can selectively close the storage area 15 into a size for containing, for example, a single large mug 20 as opposed to two conventionally sized Styrofoam coffee cups or beverage cans, as shown in FIG. 1. In the stored position as shown in FIG. 1, also the central area 15 of the tray can be utilized for storage of items other than beverage containers. The detailed construction of the tray and partitioning arm are best seen in FIGS. 3 and 4 now described.

Figure 3:
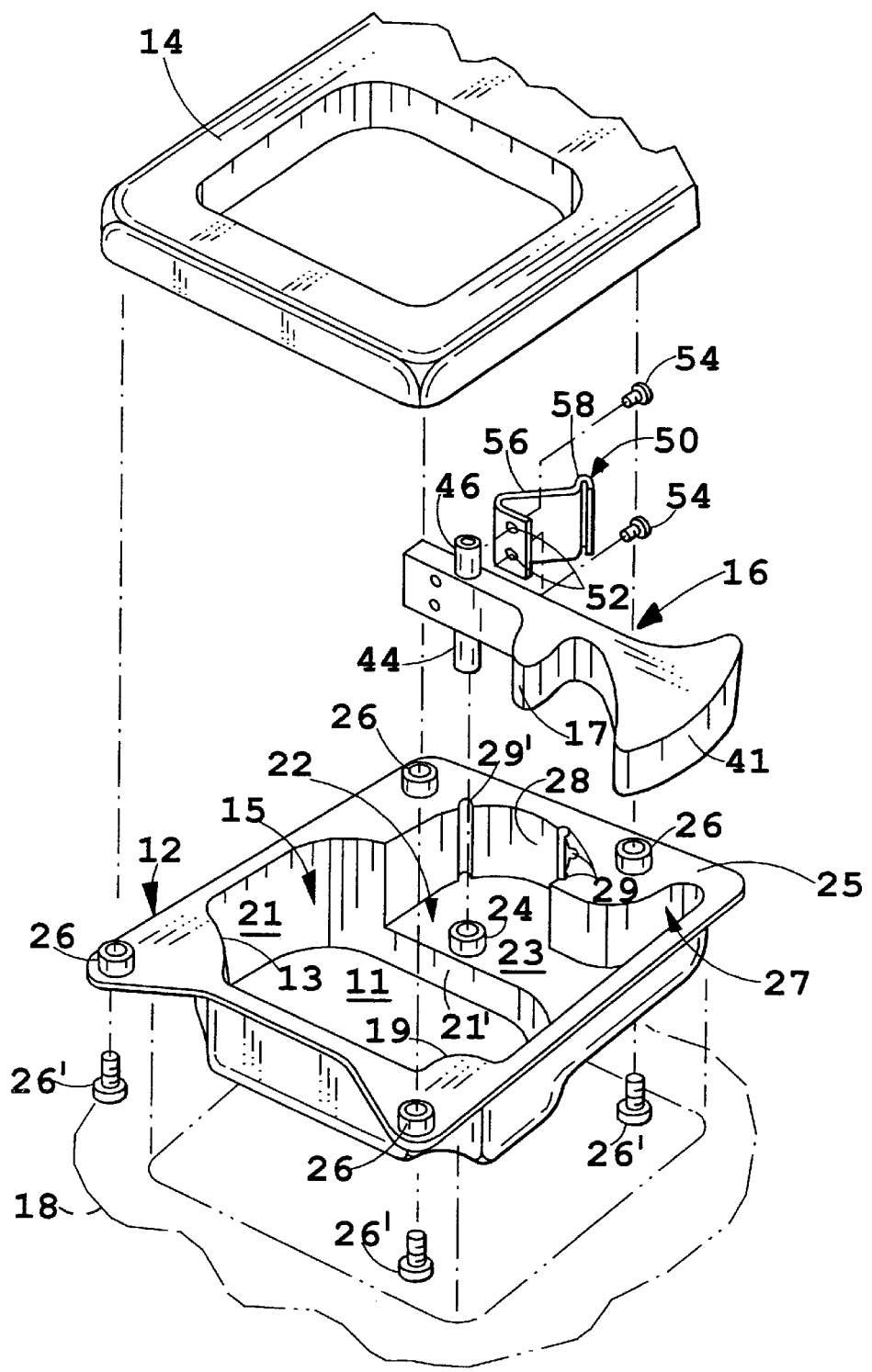
FIG. 3 is an exploded fragmentary perspective view of the tray and partitioning arm of the container holder of the present invention.

Referring initially to FIG. 3, there is shown a tray 12 which can be integrally molded of a polymeric material such as polypropylene and which defines the relatively deep central storage area 15. The tray includes a floor 11 surrounded by a vertically extending sidewall 21. Extending through sidewall section 21' of tray 12 is a recess 22 for receiving the pivoted dividing partitioning arm 16. In the floor 23 of the integrally formed recess 22 is a circular mounting boss 24 for receiving a lower pivot axle 44 of pivot arm 16 which includes an upper pivot axle 46 which extends into a similarly shaped mounting boss aligned on cover 14. Cover 14 includes apertures which align with four corner mounting posts 26 extending upwardly from the top surface 25 of tray 12 for coupling the top 14 to the tray with suitable fasteners 26' extending upwardly through the mounting posts 26 and self-threading into cover 14.

Figure 4:
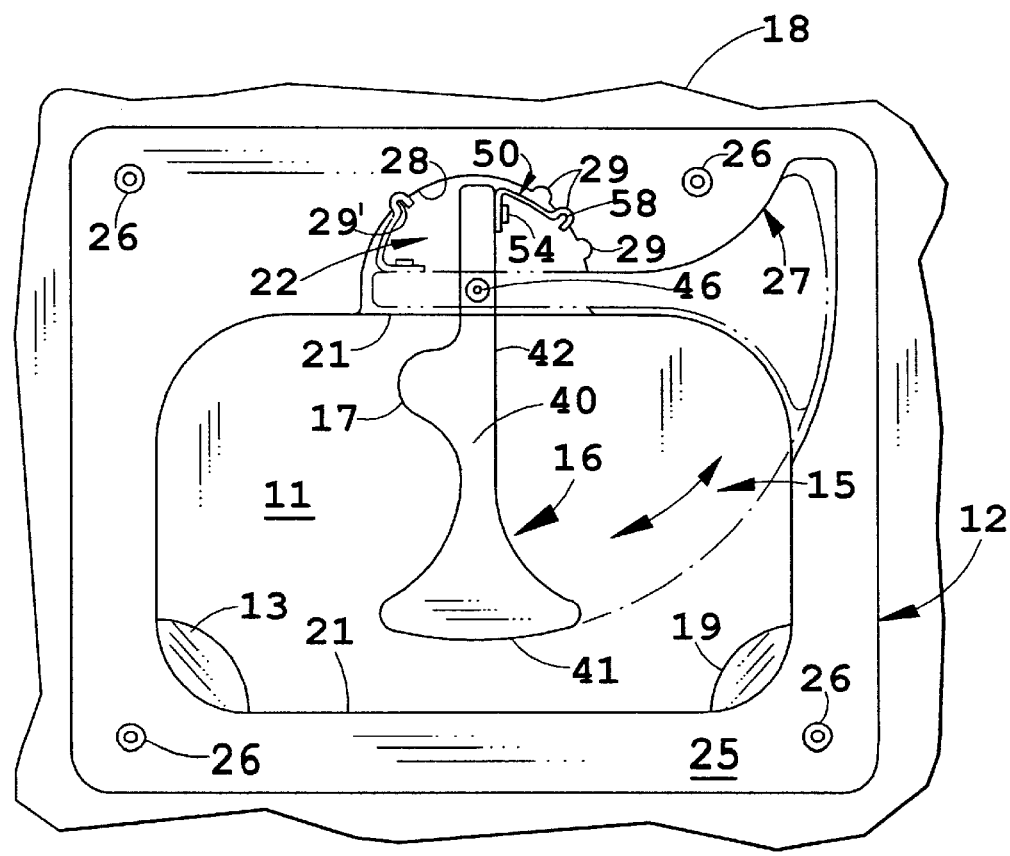
FIG. 4 is a fragmentary top plan view of the structure in FIG. 3 shown partially assembled.

The sidewall 28 of cavity 22 communicating with cavity 15 of tray 12 includes a plurality of vertically extending semicylindrical detents 29 for selectively holding the partitioning arm 16 in either a stored position, as shown in FIG. 1, or a number of different selectable use positions as shown in FIGS. 2 and 4. For such purpose, the partitioning arm 16 includes a central body 40 having a sidewall 42 to which a detent spring clip 50 is mounted by means of a pair of apertures 52 and suitable fastening screws 54 (FIGS. 3 and 4). Spring clip 50 includes an outwardly extending arm 56 having a vertically extending semicylindrical projection 58 which nestably fits within the detents 29 as illustrated in FIG. 4 for releasably holding the partitioning arm 16 in a desired position. The end 41 of arm 16 is arcuately curved and fits within a cavity 27 integrally located within cavity 22 through sidewall section 21' of tray 12.

Arm 16 also includes a projection 17 extending into cavity 15, as seen in the figures, a distance sufficient to be readily accessible and operate not only as a divider as seen in FIG. 1, but also as a handle which can be gripped by the user to move arm 16 from the stored position in which spring clip tip 58 is located within detent 29' and any of the selected use positions represented by the three-spaced detents 29 in sidewall 28 of cavity 22. With such construction, therefore, the size of cavity 15 of tray 12 can be selectively changed and employed for storing a variety of different articles including different sized beverage containers including mugs, cans, Styrofoam cups and the like. The utilization of a detentable, selectably adjustable arm allows the user to select the desired configuration for a given application.

It will become apparent to those skilled in the art that various modifications to the preferred embodiments of the invention as described herein can be made without departing from the spirit or scope of the invention as defined by the appended claims.

The invention claimed is:

1. A partitionable storage tray for mounting to a vehicle accessory comprising:

a tray defined by a floor surrounded by an upwardly extending sidewall which includes a recess for receiving a partitioning arm; and a partitioning arm pivotally mounted to said tray in said recess of said sidewall for selectively extending laterally into said tray in selectably adjustable positions for subdividing said tray into different sized storage areas.

2. The storage tray as defined in claim 1 wherein said partitioning arm is pivotally mounted to said tray.

3. The storage tray as defined in claim 2 and further including a cover extending over said recess to at least partially cover said arm when in a stored position.

4. The storage tray as defined in claim 3 wherein said tray is integrally molded of a polymeric material.

5. The storage tray as defined in claim 4 wherein said partitioning arm includes a projection which extends into said tray for all positions and which serves as a gripping member for moving said arm.

6. A partitionable storage tray for mounting to a vehicle accessory comprising:

a tray defined by a floor surrounded by an upwardly extending sidewall which includes a recess for receiving a partitioning arm; and a partitioning arm mounted to said tray in said recess of said sidewall for selectively extending into said tray in selectably adjustable positions for subdividing said tray into different sized storage areas, wherein said recess includes a plurality of spaced detents and wherein said arm includes a spring clip including an end which selectively engages said detents for allowing said partitioning arm to move to selected adjusted positions.

7. A container holder for a vehicle comprising:

a tray defined by a floor surrounded by an upwardly extending sidewall and a recess formed in the tray for receiving a partitioning arm; and a partitioning arm pivotally mounted to said tray in said recess of said sidewall for selectively extending laterally into said tray in selectably adjustable positions for subdividing said tray into different sized storage areas.

8. A container holder for a vehicle comprising:

a tray defined by a floor surrounded by an upwardly extending sidewall and a recess formed in the tray for receiving a partitioning arm; and a partitioning arm mounted to said tray in said recess of said sidewall for selectively extending into said tray in selectably adjustable positions for subdividing said tray into different sized storage areas, wherein said recess is formed in said sidewall of said tray and said arm is pivotally mounted to said tray to move from a stored position substantially within said recess to said adjustable positions extended from said recess.

9. The container holder as defined in claim 8 wherein said tray includes a second sidewall formed in said recess which includes a plurality of spaced detents and wherein said arm includes a spring clip including an end which selectively engages said detents for allowing said partitioning arm to move to selected adjusted positions.

10. The container holder as defined in claim 9 wherein said detents are semicylindrical vertically extending spaced-apart recesses formed in said second sidewall.

11. The container holder as defined in claim 10 and further including a cover extending over said recess to at least partially cover said arm when in a stored position.

12. The container holder as defined in claim 11 wherein said tray is integrally molded of a polymeric material.

13. The container holder as defined in claim 12 wherein said partitioning arm includes a projection which extends into said tray for all positions and which serves as a gripping member for moving said arm.

14. A partitionable container holder and storage tray for a vehicle comprising:

a base having a storage cavity formed therein of a size to receive at least one container;

an arm pivotally mounted to said base to selectively partition said storage cavity into one or more areas for receiving different sized objects; and detent means extending between said base and said arm for releasably holding said arm in a plurality of different selected positions.

15. The container holder as defined in claim 14 wherein said base includes a recess formed in a side of said cavity for receiving said arm.

16. The container holder as defined in claim 15 wherein said arm includes a projection which extends into said cavity for dividing said cavity into two sections when said arm is in a fully retracted position within said recess.

17. The container holder as defined in claim 16 wherein said detent means comprises one of a plurality of detents in a spring clip on said base and the other of a plurality of detents and a spring clip on said arm.

18. The container holder as defined in claim 17 wherein said base is an integrally molded tray.

19. The container holder as defined in claim 18 and further including a cover for covering said recess of said base.

20. The container holder as defined in claim 19 wherein said cavity is generally rectangular with quarter-round fillets in at least two corners thereof.

* * * * *